(12) United States Patent
Simpson (10) Patent No.: US 9,254,828 B2
(45) Date of Patent: Feb. 9, 2016

(54) SAFETY VALVE FOR TRAILER

(71) Applicant: Edwin Bernard Simpson, Graysville, GA (US)

(72) Inventor: Edwin Bernard Simpson, Graysville, GA (US)

(*) Notice: Subject to any disclaimer, the term of this patent is extended or adjusted under 35 U.S.C. 154(b) by 0 days.

(21) Appl. No.: 14/326,954

(22) Filed: Jul. 9, 2014

(65) Prior Publication Data

US 2014/0318903 A1 Oct. 30, 2014

Related U.S. Application Data

(63) Continuation-in-part of application No. 13/969,209, filed on Aug. 16, 2013.

(60) Provisional application No. 61/684,272, filed on Aug. 17, 2012.

(51) Int. Cl.
| | |
|---|---|
| B60T 15/36 | (2006.01) |
| B60T 17/22 | (2006.01) |
| B60T 17/20 | (2006.01) |
| B60T 7/20 | (2006.01) |
| B60T 17/04 | (2006.01) |
| B60R 25/08 | (2006.01) |
| B60T 15/54 | (2006.01) |

(52) U.S. Cl.
CPC .............. B60T 15/36 (2013.01); B60R 25/08 (2013.01); B60T 7/20 (2013.01); B60T 17/04 (2013.01); B60T 17/20 (2013.01); B60T 17/22 (2013.01); B60R 25/086 (2013.01); B60T 15/54 (2013.01)

(58) Field of Classification Search
CPC ......... B60T 15/36; B60T 15/54; B60T 17/20; B60T 17/22; B60R 25/08; B60R 25/086

USPC .................... 303/123, 84.2, 85, 89
See application file for complete search history.

(56) References Cited

U.S. PATENT DOCUMENTS

| | | | |
|---|---|---|---|
| 3,973,805 A | 8/1976 | Stevenson et al. | |
| 3,998,495 A | 12/1976 | Maxwell et al. | |
| 5,145,240 A | 9/1992 | Harless et al. | |
| 5,378,929 A | 1/1995 | Mor et al. | |
| 5,722,517 A * | 3/1998 | Sayama | B60T 7/10 188/353 |
| 5,747,886 A | 5/1998 | Parr et al. | |
| 5,984,425 A * | 11/1999 | Orzal | B60T 15/041 188/170 |
| 6,007,159 A | 12/1999 | Davis et al. | |

(Continued)

OTHER PUBLICATIONS

Non-Final Office Action in related U.S. Appl. No. 13/969,209 mailed Feb. 13, 2015.

*Primary Examiner* — Thomas Irvin
(74) *Attorney, Agent, or Firm* — Meunier Carlin & Curfman LLC (57) ABSTRACT

Systems and methods of overriding a conventional trailer emergency brake system to preclude and alert others as to inadvertent or premature movement of the trailer are described herein. One implementation includes a safety valve operatively positioned in the emergency braking system of a trailer that may be engaged to override the brake valve located in a tractor to prevent a truck driver from prematurely or inadvertently moving the trailer. In addition, the system may include a one way check valve to allow air upstream of the safety valve to bleed out of the brake system when the safety valve is closed (to prevent movement of the trailer) before the emergency brakes for the trailer are set by the driver. A communication system may also be provided to alert the driver via a remotely located computing device that the emergency brakes for the trailer need to be set.

9 Claims, 7 Drawing Sheets

(56) References Cited

U.S. PATENT DOCUMENTS

| | | | |
|---|---|---|---|
| 6,260,934 B1 * | 7/2001 | Lee | B60T 7/122 303/192 |
| 6,634,721 B2 | 10/2003 | Holt | |
| 6,652,042 B2 | 11/2003 | Johnson | |
| 7,059,690 B1 | 6/2006 | Pinkston | |
| 7,191,862 B2 | 3/2007 | Wattenburg et al. | |
| 7,344,204 B2 | 3/2008 | Cayer | |
| 7,586,401 B2 | 9/2009 | Payne | |
| 7,631,950 B2 | 12/2009 | Wattenburg | |
| 7,931,343 B2 * | 4/2011 | Vescovini | B60T 13/22 188/170 |
| 8,028,811 B2 * | 10/2011 | Rocca | B60T 13/22 188/151 A |
| 2007/0063582 A1 | 3/2007 | Bryar | |
| 2007/0102997 A1 | 5/2007 | Cayer | |
| 2009/0160245 A1 * | 6/2009 | Accardi | B60T 15/041 303/3 |
| 2014/0318903 A1 | 10/2014 | Simpson | |

* cited by examiner

SAFETY VALVE FOR TRAILER

This application is a continuation-in-part of U.S. patent application Ser. No. 13/969,209, filed Aug. 16, 2013 entitled "SAFETY VALVE FOR TRAILER," which claims the benefit of U.S. Provisional Patent Application No. 61/684,272, filed on Aug. 17, 2012, entitled "SAFETY VALVE FOR TRAILER."

BACKGROUND OF THE INVENTION

Tractor trailer or "semi" trailer trucks are well known and widely used to haul a wide range of goods across great distances. A conventional tractor trailer truck includes a tractor that pulls a trailer. A conventional tractor includes an engine, a cabin for the driver, and, in some instances, a sleeper compartment. A conventional trailer is used to haul a variety of goods and may take various forms, ranging from a box-like container with an enclosed cargo space to a flatbed to a car hauler. The prior art also includes box trucks that provide a truck with an attached bed. As described herein, the various implementations of the invention are applicable to all trucks and vehicles that utilize air brakes and hydraulic fluid brakes.

Due to their substantial size and weight, tractor trailer trucks conventionally use air pressure, rather than standard hydraulic fluid, to actuate the brakes. Not only does an air pressure brake system provide greater braking power, it reduces the potential for certain problems with conventional hydraulic brake systems such as leakage or vaporization of the hydraulic brake fluid. Further, because the tractor brake system may be connected with the trailer brake system, it is more convenient to use an air pressure system because it allows for a tractor to be connected to multiple trailers.

The parking brake of the tractor and the emergency brake of the trailer are conventionally spring brakes that also operate on air pressure. The springs cause the brakes to be applied. More particularly, the tractor's parking brake and the trailer's emergency brake require air pressure in order to be released. When air pressure is applied to the tractor trailer truck braking system, the parking brake and the emergency brake are released. In contrast, when air pressure is released from the tractor trailer truck braking system, the parking brake and the emergency brake are applied by action of the springs. In this way, the truck driver may be assured that if air pressure is inadvertently released or lost from the braking system, the trailer will brake to a stop instead of not being braked and, perhaps, becoming uncontrollable.

Further, a truck driver conventionally applies tractor and trailer parking brakes by operating valves that either deliver or release compressed air to the brake system. More particularly, a tractor conventionally includes a tractor parking brake valve and a trailer parking brake valve. Once the driver has positioned the tractor and trailer as desired, the driver will manipulate the tractor parking brake valve to release compressed air from the tractor brake system and thereby apply the tractor parking brakes. Similarly, the driver will manipulate the trailer parking brake valve to release compressed air from the trailer brake system and thereby apply the trailer parking brakes. It is also known to provide for the two valves to cooperate such that when the truck driver manipulates the tractor parking brake valve, the trailer parking brake valve is simultaneously activated so that both the tractor and trailer parking brakes are applied.

With specific reference to the parking or emergency brake for the trailer, the valve is manipulated by the truck driver to supply compressed air to the trailer emergency brake system and release the brakes. In this manner, the truck driver can release the trailer emergency brake in order to pull the trailer away from the dock. By virtue of the foregoing arrangement, the truck driver is also able to release the tractor parking brake and pull the tractor away from the trailer without releasing the trailer parking brakes. Once the truck driver re-connects the tractor to the trailer and seeks to again move the trailer, the driver can manipulate the trailer emergency brake valve (in the tractor) to deliver compressed air to the trailer brake system and release the parking brakes.

In use, a trailer is conventionally loaded and unloaded at a loading dock. The tractor trailer truck operator maneuvers the trailer into position by backing the tractor and trailer up against the loading dock in such a way that the dock surface is substantially level with the surface of the trailer. The rearward most portion of the trailer is positioned adjacent to the loading dock so that a forklift or like equipment may be driven onto the trailers floor surface to unload or load the trailer.

A safety problem exists in the loading or unloading of trailers. For example, if a trailer is moved away from the dock before the forklift operator or other dock worker completes loading or unloading of the trailer, the dock worker or equipment may be jeopardized. The worker or product or forklift may fall between the rear edge of the trailer and the loading dock, causing harm to the worker or damage to the goods or the equipment. The truck driver may inadvertently pull the trailer away from the dock without knowing or realizing that the loading or unloading process is not complete. For these and other reasons, it is preferable that a trailer not be prematurely or inadvertently pulled away from the dock, or that the truck driver be alerted to the fact that the trailer is in use. There is a need in the art for a device and method that addresses premature or inadvertent movement of a trailer from a dock.

BRIEF SUMMARY

Various implementations of the invention address the premature or inadvertent movement of a trailer positioned at a dock. More particularly, devices and methods are described that may be engaged or practiced by a tractor trailer truck driver, a forklift operator, a dock worker or other person to override the conventional trailer emergency brake system so as to preclude and alert others as to inadvertent or premature movement of the trailer. For example, various implementations include a safety valve that diverts air away from releasing the trailer parking brakes when the valve is in a closed position. The air may be diverted to a warning device, such as an air horn, to warn the driver and/or dock personnel that the parking brakes for the trailer have not been secured or have been prematurely released.

Described somewhat more particularly, one implementation includes a safety valve operatively positioned in the emergency brake system of a trailer system that may be engaged to override the trailer parking brake valve located in the tractor to prevent the truck driver from prematurely or inadvertently moving the trailer and/or to alert the driver, a dock worker or others of any premature or inadvertent moving of the trailer. The safety valve may be located in a sidewall of a trailer so as to be accessible from only the interior of the trailer. By manipulation of the safety valve to a closed position, for trucks in which compressed air causes the brakes to be released, compressed air is prevented from being transmitted to the trailer brake system components such that the truck driver is unable to release the trailer brakes. Moreover, when the safety valve is in a closed position, compressed air is diverted to means for alerting the driver, a dock worker or others before the trailer could be moved. By manipulation of the safety valve to an open position, compressed air is transmitted to the trailer brake system, and the truck driver is able to release the trailer brakes and, correspondingly, move the trailer.

In an alternative implementation, the safety valve includes multiple chambers, wherein one chamber is utilized to activate an alert flag positioned in a readily viewable location, such as the outside front portion of the trailer, so as to alert a driver or other individual that the trailer is in use and should not be moved. If compressed air is delivered to this chamber of the safety valve, and the valve is in an open position, the air passing through the valve causes a notification to be displayed stating, for example, that the trailer is in use and should not be moved.

In another alternative implementation, the safety valve may be provided in a compartment that includes an alert whistle or an air horn or any other air powered alerting device that is activated to alert a fork lift operator or other individual at or near the dock that the trailer could be moved. If compressed air is delivered to the safety valve, the air passing through it causes the whistle to sound an alert.

In yet another alternative implementation, the safety valve includes one or more air horns or alert whistle or other air powered aural device that may be positioned on the outside front portion of the trailer so as to be readily heard by a truck driver or other individual near the tractor. If compressed air is delivered to the safety valve, air passing through the valve causes the air horns to sound on alert. In a further implementation, the valve is in fluid communication with a visual alert that is activated in response to compressed air diverted by the second safety valve.

In yet another alternative implementation, the safety valve may be placed in any suitable location on the trailer and responsive to a remote activation device such as an electrical switch on the inside wall of the trailer that would cause the safety valve to close and open. In such an implementation, manipulation of the electrical switch causes the safety valve to close and prevents compressed air from being transmitted to and releasing the trailer parking brake. Conversely, another manipulation of the electrical switch causes the safety valve to open and allows compressed air to be delivered to the trailer parking brake system so as to release the trailer parking brake. The position of the safety valve is thus variable. The switch may be located on the inside wall of the trailer.

In yet another implementation, the safety valve may be associated with a release valve that may be provided on the exterior of the trailer (for example, on the bottom of the trailer) so as to override or open the safety valve in the event the trailer is locked and the safety valve is not accessible. Such a release valve allows a truck driver to release the trailer parking brakes without access to the safety valve.

Thus, various implementations of the invention may provide one or more of the following advantages: (1) address and enhance the safe use of tractor trailer trucks; (2) address problems associated with premature or inadvertent movement of a trailer attached or connected to a tractor; (3) provide a safety device that allows one to override the trailer brake release mechanism such that a truck driver cannot inadvertently or prematurely move a trailer at a loading dock; (4) alert a truck driver, fork lift operator or other dock worker of an inadvertent or premature or other possible movement of a trailer; (5) remotely override the trailer emergency brake release valve that is conventionally provided in a tractor; (6) utilize the compressed air in a tractor trailer truck brake system to operate a remote safety valve that is able to override the emergency brake valve in a tractor and to alert a truck driver or other individual that the trailer is in use and is preferable not to be moved; (7) alert a truck driver or other individual whether a trailer is in use when the truck driver operates the emergency brake valve in a tractor by providing both visual and aural notification of any such use; (8) provide a check valve adjacent a safety valve to bleed compressed air from the trailer emergency braking system when the safety valve is engaged prior to the emergency brake being engaged; and (9) alert a truck driver or other personnel that an emergency brake on the trailer has not been engaged via a wireless communication system when the truck driver or personnel are remotely located relative to the tractor and/or engage the trailer emergency brake system remotely.

The details of one or more implementations are set forth in the accompanying drawings and the detailed description herein. Other features, objects and advantages of various implementations of the invention will be apparent from this description, the drawings, and claims.

DETAILED DESCRIPTION

Figure 1:
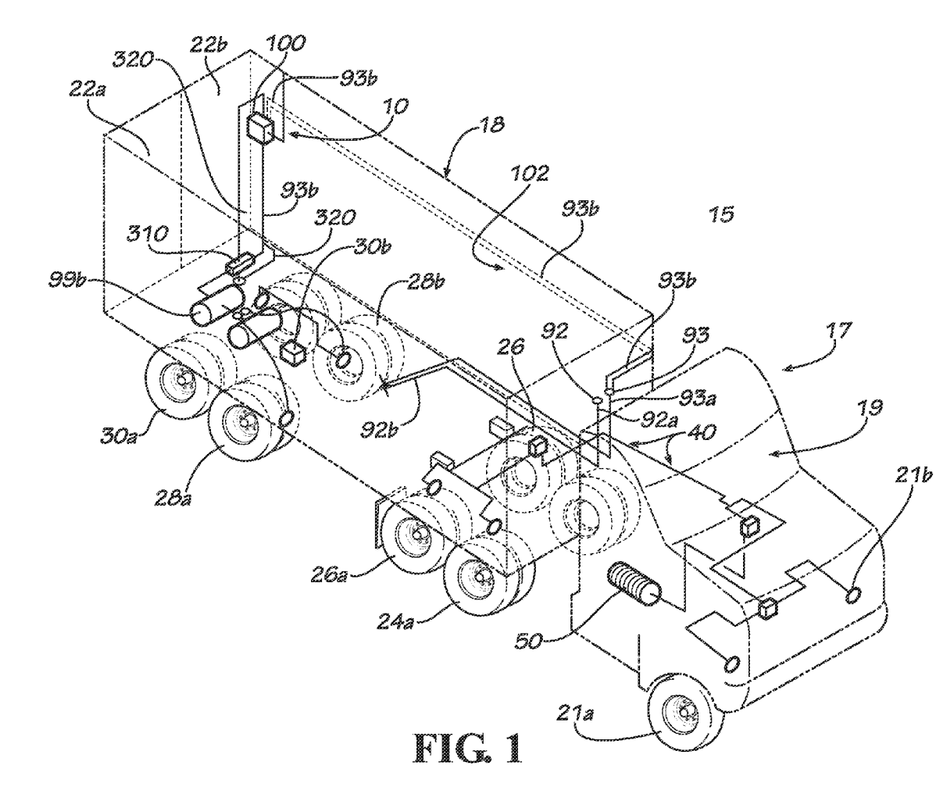
FIG. 1 is a pictorial representation of a tractor trailer truck including a safety valve in accordance with one implementation of the present invention.
Figure 2:
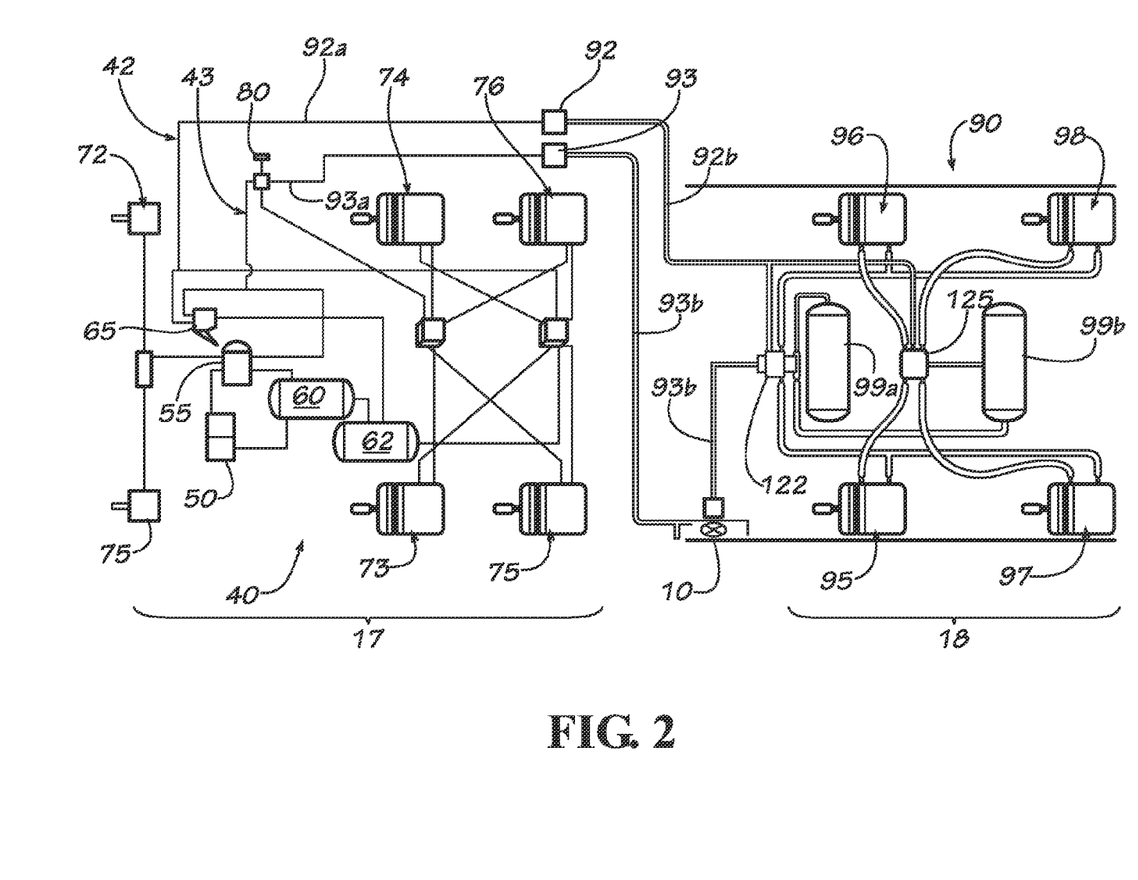
FIG. 2 is a schematic representation of the trailer brake system including the safety valve shown in FIG. 1.

Referring now in more detail to the drawings, in which like numerals indicate like parts throughout the several figures, FIG. 1 shows a safety valve 10 provided with a tractor trailer truck 15 in accordance with one implementation of the present invention. The tractor trailer truck 15 includes a tractor 17 and a trailer 18. The tractor 17 includes an engine (not shown) and a cabin 19 in which a truck driver sits to drive the tractor trailer truck 15. The tractor 17 has three axels, the forward most axel supports two wheels 21a and 21b at the forward end of the tractor 17. The tractor 17 further includes two rear axels that support two sets of tires 24a, 24b (not shown), and 26a, 26b (not shown) that rest below the forward portion of the trailer 18. The trailer 18 is a box-like trailer that is well known and able to haul a variety of goods. The rear wall of the trailer 18 conventionally provides doors 22a and 22b for loading and unloading, including by means of a forklift (not shown). It will be appreciated that the rear doors may also take the form of a roller door, as is well known in the art. The trailer 18 is carried by two axels that support two sets of tires 28a, 28b, and 30a, 30b.

The person of ordinary skill will recognize the tractor trailer truck 15 shown in FIG. 1 to be representative of an "18 wheel" tractor trailer truck configuration. The person of ordinary skill in the art will further appreciate that said "18 wheel"

tractor trailer truck configuration is merely representative and not limiting as the present invention may be readily adapted to any vehicle that has air brakes, including any other trucks, tractors, trailers and braking configurations that utilize air brakes. Further, the person of ordinary skill will recognize that the disclosed and claimed inventions are readily adapted to trucks that utilize a hydraulic fluid, including but not limited to compressed air, as a medium by which to activate the brake assemblies. Thus, while the present invention is described in reference to an "18 wheeler" tractor trailer truck, the invention is applicable to a wide variety of other tractors, trailers, trucks and vehicles.

A tractor trailer truck brake system is identified generally at 40. The brake system 40 includes a service brake system 42 and a parking brake system 43. The brake systems 42 and 43 are comprised of several components. A compressor 50 is provided that compresses and pumps air. The compressor 50 is driven by the tractor's engine and conventionally provided with a governor (not shown) to control the air pressure in the brake system. The compressor 50 is running whenever the tractor engine is running. When pressure in the brake system 40 is adequate, it is not necessary for the compressor to pump air. The governor controls the minimum and maximum air pressure in the brake system 40 by controlling when the compressor pumps air to insure that there is an adequate supply of appropriately compressed air for use by both the service system 42 and the emergency parking system 43.

The compressor 50 delivers air to a dryer 55 and thereafter to a reservoir 60 that contains the compressed air supply. Many vehicles are equipped with more than one reservoir for purposes of redundancy and to insure an adequate supply of compressed air to insure operation of the brake system 40. For example, a second reservoir 62 is provided in the tractor 17. For convenience, the first reservoir 60 may be referred to as the primary reservoir. Any other or remaining reservoirs, such as that shown at 62, may be referred to as secondary reservoirs. The person of ordinary skill in the art will appreciate that the present invention is readily adapted to any number of reservoirs.

The person of ordinary skill will appreciate that the service brake system 42 includes a foot valve or brake pedal (treadle) 65 that regulates the flow of compressed air and causes the service brakes to be applied in the usual manner. More particularly, compressed air may be delivered from the reservoirs 60 or 62 to a plurality of tractor brake assemblies 71, 72, 73, 74, 75 and 76. The brake assemblies 71-76 facilitate the service brake system in a conventional manner.

The person of ordinary skill will also appreciate that the brake assemblies 71-76 further include a spring brake parking or emergency brake system 43 wherein the brakes are applied by spring pressure and released by air pressure. The person of ordinary skill will further appreciate that brake assemblies 71-72 may be disc brakes and may not include a spring parking brake. Accordingly, the following description of the tractor brakes will focus on brake assemblies 73-76. Conventionally, the emergency or parking brake chambers of assemblies 73-76 may be attached to the service brake chambers and operate by means of many of the same linkage elements. In the emergency or parking brake system of the tractor 17, the brakes 73-76 are applied by spring action and released by air pressure. Operation of the tractor emergency or parking brake system 43 is known in the art. Accordingly, for convenience, the same reference numerals 73-76 are used to indicate both the tractor service brake and the spring (parking) brake components.

As is known in the art, a loss of compressed air from the emergency braking system 43 will cause the springs to apply the brakes of the brake assemblies 73-76, thereby acting as a parking brake. Further, a supply of compressed air to the brake assembles 73-76 will cause the springs to release the parking brake to permit free movement of the tractor 17. With regard to the tractor emergency brake system 43, the supply of compressed air releases the brake of the brake assemblies 73-76, whereas the release of compressed air allows the springs of the brake assemblies 73-76 to apply the parking brakes. Of course, in the event of a loss of air pressure in the system during operation of the tractor 17, the springs act to engage the brakes of the brake assemblies 73-76, which also act as an emergency brake to assist in stopping the tractor 17.

The trailer 18 includes a brake system 90. The trailer emergency brake system 90 is conventionally coupled to the tractor brake system 40 by use of "glad hands" connectors 92 and 93 that facilitate connection of the tractor service brake system 42 to the trailer service brake system and connection of the tractor parking brake system 43 to the trailer parking or emergency brake system, respectively. The person of ordinary skill will recognize that the glad hands connectors 92 and 93 are typically provided on the driver's side of the tractor 17. More particularly, the connector 93 connects the tractor's emergency brake line 93a and the trailer's emergency brake line 93b. A similar connection is made for the service lines 92a and 92b by means of connector 92. Those of ordinary skill in the art will recognize that the service line is conventionally blue in color whereas the emergency line is conventionally red in color. Since the service brake system may otherwise be conventional in construction and operation, it is not further addressed.

The trailer brake system 90 includes an emergency air line 93b that delivers compressed air to the trailer's service brake system. As stated above, a tractor conventionally includes a tractor parking brake valve and a trailer parking brake valve. Once the driver has positioned the tractor and trailer as desired, the driver will manipulate the tractor parking brake valve to release compressed air from the tractor brake system and thereby apply the tractor parking brakes. Similarly, the driver will manipulate the trailer parking brake valve to release compressed air from the trailer brake system and thereby apply the trailer parking brakes. It is also known to provide for the two valves to cooperate such that when the truck driver manipulates the tractor parking brake valve, the trailer parking brake valve is simultaneously activated so that both the tractor and trailer parking brakes are applied. It is therefore to be understood that the tractor cabin 19 includes a valve 80 in emergency air line 93a that can be manipulated by the truck driver. In conventional operation, the truck driver would manipulate the emergency air line valve 80 to supply or to release compressed air to the emergency brake system and release the parking brake in the tractor 17. However, if desired, the release of compressed air in the emergency brake system may be organized such that when the truck driver manipulates the tractor parking brake valve, the trailer parking brake valve 80 is simultaneously activated.

The trailer brake system 90 includes brake assemblies 95, 96, 97 and 98. The trailer brake assemblies 95-98 are substantially identical to the tractor brake assemblies 73-76. Importantly, the trailer brake assemblies 95-98, as explained previously in reference to the tractor brake assemblies 73-76, include springs that cause the brakes of brake assemblies 95-98 to be applied when compressed air is released from the trailer brake system 90. Similarly, when compressed air is supplied to the trailer brake system 90, the brakes of assemblies 95-98 are released (not applied) and the trailer is free to be moved by the tractor 17. The details of the construction of the brake assemblies 71-76 and 95-98 are well known and further description of the such assemblies is unnecessary because such assemblies are well known to the person of ordinary skill in the art.

As shown, the trailer 18 is fitted with two secondary reservoirs 99a and 99b. The reservoirs 99a and 99b are supplied with compressed air by the compressor 50 by means of the glad hand connector 93 and a trailer emergency air line 93b, thus insuring sufficient compressed air for proper operation of the emergency brakes 95-98 (as supplied by lines 93a/93b). Thus, the reservoirs 99a and 99b are in fluid communication with the brake assemblies 95, 96 and 97, 98 and are capable of supplying compressed air to all of the brake assemblies.

As further shown in the drawings, the safety valve 10 is placed in the trailer's emergency brake system air line 93b. The safety valve 10 is preferably located within a compartment 100 located in the driver side sidewall 102 of the trailer 18 near the rear end thereof. Preferably, the safety valve 10 is located behind a vertically sliding door 103 that is accessible from the interior of the trailer 18 and adapted to move between an open position and a closed position. See FIG. 1. Those of ordinary skill in the art will appreciate that the compartment 100 is to be narrow in construction and not protrude into the trailer 18 so that the compartment does not influence or interrupt loading or unloading of the trailer 18. The compartment 100 is preferably of a dimension to fit wholly within the sidewall 102 of the trailer 18. If necessary, the compartment 100 may protrude outwardly of the trailer sidewall 102 and, if desired, fitted with a wind shield or other aerodynamic device to facilitate operation. Preferably, the sliding door 103 is similarly constructed so as not to protrude into the trailer 18. For example, the door 103 may be provided with an integral aperture or an indented finger grip (not shown) so as to manipulated with one digit. Such a construction is preferred to create a flat surface with no projection into the trailer 18. The door 103 may be constructed to withdraw into the compartment 100 in an accordion-like fashion, or otherwise. The detail of any such construction is within the skill of the person of ordinary skill. Further, the door 103 may be biased into a closed position such that once a user removes his or her finger from any indentation or aperture, the door returns to a closed position. The sliding door 103 will thus prevent the safety valve 10 from being damaged or accidentally actuated by falling freight or contact with a lift truck or stored item. The narrow profile of the compartment 100 will also preclude the safety valve 10 from being unintentionally rotated (open or closed) when the door 103 is in a closed position, whether the trailer 18 is at a dock or being moved by the tractor 17. Should freight or another object fall or lodge against the door 103, such will effectively wedge the door against the handle 200 (see below) and preserve the safety valve's 10 position.

It is to be understood that the safety valve 10 may have multiple chambers. The valve 10 may readily be a 2-way valve or a 3-way valve. The safety valve chambers may be provided in a single device or multiple devices. The safety valve 10 shown in FIG. 3 has a handle 200, a stem 202 and two chambers 210 and 220. It is to be understood that valve 10 could be provided with a single chamber 210, or with additional chambers depending on the uses to be made as described herein. In the device shown in FIG. 3, the valve stem 202 extends through or past the chamber 210 into the chamber 220. Thus, by turning the handle 200, a user may simultaneously manipulates both chambers 210 and 220. As described herein, it is to be understood that the chamber 210 is to be closed when the chamber 220 is open, and vise versa. Other arrangements may of course be provided within the scope of the present invention. More particularly, it will be appreciated that the handle 200 shown in FIGS. 3 and 4 may be rotated from a first position 200a to a second position 200b to affect either opening or closing of chamber 210. As shown, it will be therefore appreciated that by manipulating the handle 200, the flow of compressed air in line 93b can be blocked and diverted. When the handle 200 is at position 200a, the chamber 210 is open such that compressed air can flow through the valve 10 to the trailer brake system 90 to release the parking brake in assemblies 95-98. However, when handle 200 is rotated to position 200b, the chamber 210 of safety valve 10 is closed, which blocks the flow of compressed air to the brake assemblies 95-98 and maintains the parking or emergency brake.

Figure 5:
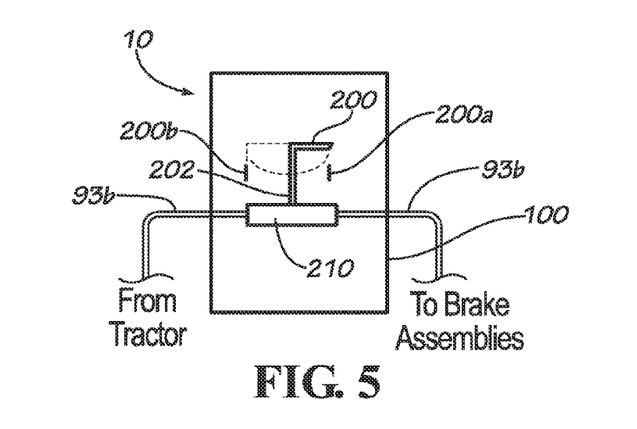
FIG. 5 is a schematic representation of a compartment containing a safety valve in accordance with an alternative implementation.

In another embodiment, the safety valve 10 may appear as in FIG. 5, with a single chamber 210 in fluid communication with trailer emergency brake air line 93b. In this embodiment, compressed air received by the chamber 210 is either delivered through air line 93b to the brake system 90 to release the trailer emergency brakes 95-98 or, by rotating the handle 200 to position 200b, the safety valve 10 blocks the flow of compressed air and thus prevents any release of the trailer's emergency brakes 95-98. In this manner, the present invention can provide a forklift operator control to override the trailer brake system and prevent premature or inadvertent movement of the trailer 18 until the valve 10 is opened by rotating handle 200 back to position 200a. Further, the person of ordinary skill in the art will appreciate that various valve stem and handle configurations are possible. For example, the valve may be in the nature of a lever or U-shape so that it can be placed flush with the trailer sidewall and flipped from one side to the other to manipulate the valve stem. In such an arrangement, it would be preferable for the lever or U-shaped handle to be spring loaded such that whenever the handle was moved from one side to the other, a spring would bias the handle in the direction of its movement so that it was secured in a given position. In that manner, should the handle be moved to the open valve position, the spring bias would case the handle to remain in that position. Similarly, should the handle be moved into the closed position, it would be biased so as to remain in that position.

Figure 3:
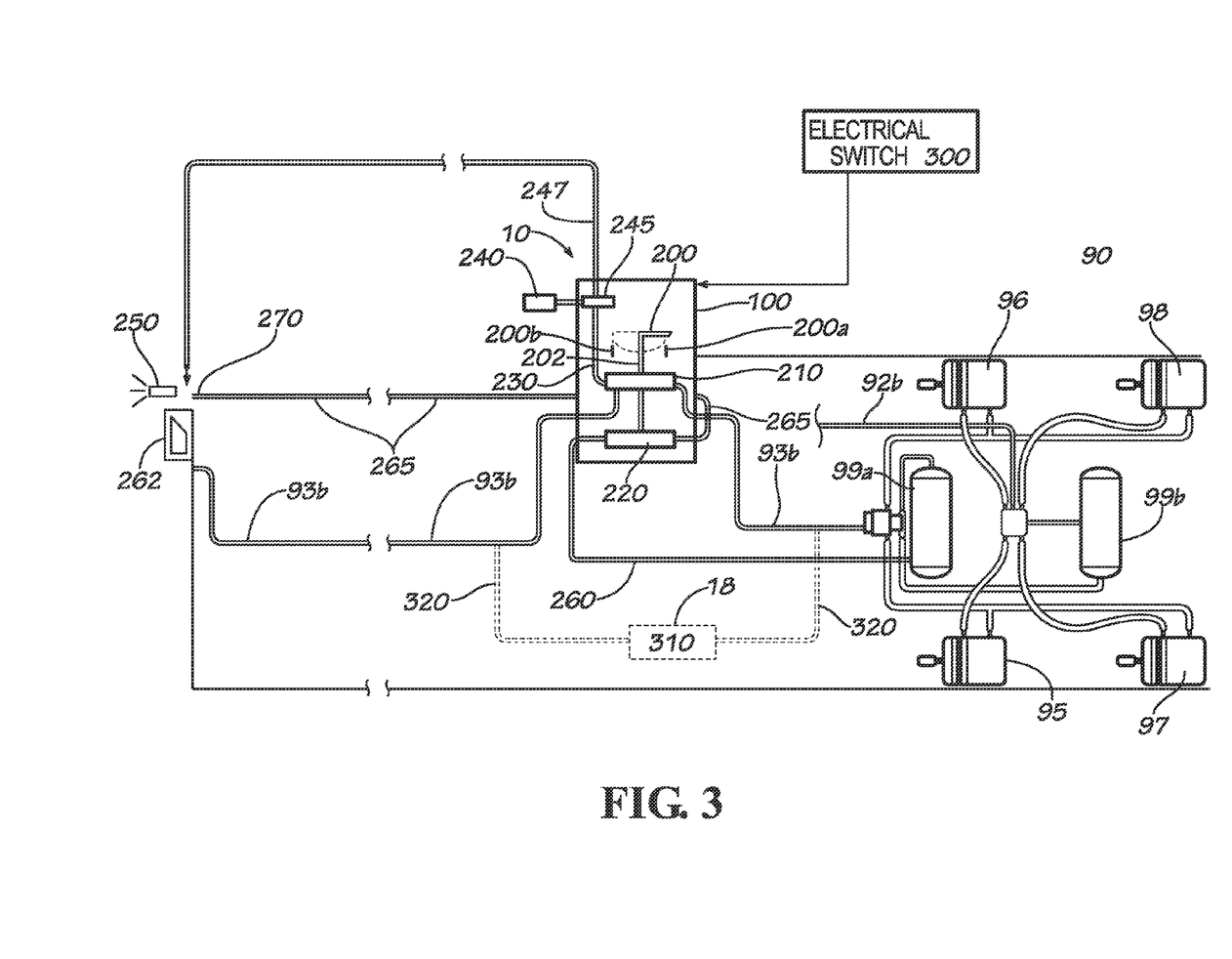
FIG. 3 is a schematic representation of the trailer brake system shown in FIG. 2 including a front view of a compartment containing the safety valve.

A safety valve 10 according to the present invention provides other alternative preferred embodiments that not only block the flow of compressed air through the chamber 210, but also divert the compressed air to associated devices that are capable of alerting a truck driver or other person that the trailer 18 is in use and not ready to be moved. Referring in more detail to FIG. 3, it is shown that a second air line 230 is provided that connects to a whistle 240 through a "t" connector 245. The whistle 240 is powered by compressed air flow and capable of sounding an aural alert. The details of providing and sounding such a whistle are known to the person(s) of ordinary skill in the art.

The alternative preferred embodiment shown in FIG. 3 further includes an air line 247 that extends from the other side of the "t" connector 245 to the front outside of the trailer 18 to engage an air horn 250. The air horn 250, which may also be an air whistle or other appropriate sound device, may be positioned on the front nose of the trailer 18 so as to alert a truck driver or other person located in the vicinity of the cabin 19 or the tractor 17 or otherwise in front of the trailer 18. The air horn (or horns) 250 are powered by compressed air in a conventional manner. With specific reference to the form of the invention shown in FIG. 3, the person of ordinary skill will appreciate that when the chamber 210 is closed by rotation of the handle 200, the compressed air delivered by way of air line 93b may be directed to the air whistle 240 and the air horn 250 in order to sound alert alarms both inside (by means of the whistle 240) and outside of the trailer 18 (by means of the air horn 250).

Figure 4:
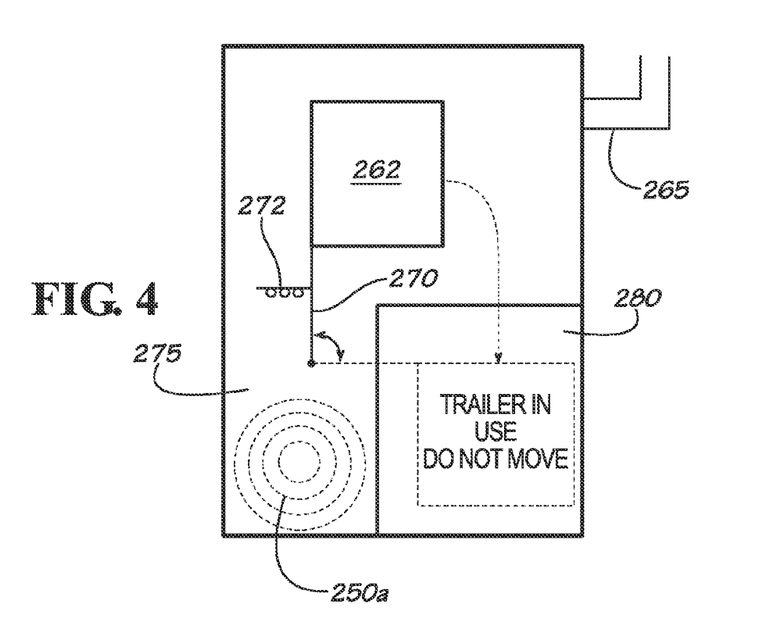
FIG. 4 is a representation of a flag or alert notice provided in a compartment with an aural device according to one implementation.

As described above, the alternative preferred embodiment shown in FIG. 3 further includes a second chamber 220. As shown, chamber 220 of the safety valve 10 is in fluid communication with secondary reservoir 99a by means of an air line 260. Further, this alternative preferred embodiment includes an alert flag 262 that is in fluid communication with chamber 220 by means of air line 265. Directing compressed air to the alert flag 262 causes a display flag to be deployed, which preferably warns: "TRAILER IN USE DO NOT MOVE," as shown in FIG. 4. The notice may be comprised of any suitable language. The alert flag 262 is preferably hingably mounted on an arm 270 that is biased by a spring 272 into a withdrawn position behind a metal plate 275 or like enclosure when no compressed air is being delivered thereto. However, when compressed air is delivered to the alert flag 262 via air line 265, the arm 270 is deployed or rotated into position before a glass 280 or other transparent material to reveal the notification. Once compressed air is no longer delivered to the alert flag 262, there is a release of compressed air from the system such that the arm 270 retracts the flag 262 to withdraw the written warning. The details of providing a display of a notice flag 262 in response to or powered by compressed air is within the purview of a person of ordinary skill in the art. In one implementation, the air horn 250 and the flag 262 are disposed in the same housing. However, in other implementations, the air horn 250 and the flag 262 may be disposed in separate housings.

Moreover, as shown in FIG. 4, the air horn 250 may be provided in a single compartment with a grill 250a or the like to facilitate transmission of the air horn sound to the exterior of the compartment. However, as shown in FIG. 3, the air horn may also be provided on the front of the trailer 18. It is to be understood that the alert flag 262 is displayed once the valve 10 is manipulated to open the chamber 220 such that the warning is provided while the trailer 18 is being loaded and unloaded, or until the chamber 220 is closed by manipulation of the handle 200.

Thus, from the foregoing it will be understood that the present invention addresses the premature or inadvertent movement of a trailer 18. A forklift operator or other person closes the safety valve 10 so as to block and divert compressed air in chamber 210 to the air whistle 240 and air horns 250, and opens the chamber 220 so that compressed air can flow from the reservoir 99a to power the alert flag 262. In the event a truck driver prematurely manipulates the valve 80 in the emergency line 93a of the tractor 17, compressed air is delivered to the emergency air line 93b of the trailer 18. The compressed air is blocked from reaching the trailer brake system 90 and the brake assemblies 95-98, thus insuring that the emergency brake remains applied by action of the springs. Instead, the compressed air is directed by the safety valve 10 to the air whistle 240 and the air horns 250. The whistle 240 and the horns 250 sound to alert the driver that the trailer 18 is still in use. Further, by opening chamber 220, compressed air is delivered to the alert flag 262, which provides a visual alert that the trailer 18 is still in use and should not be moved, in accord with display language to that effect as shown in FIG. 4. Once the unloading or loading process is complete, the forklift operator or other person rotates the handle 200 of the valve to open chamber 210 so that compressed air may be delivered to the trailer brake system 90 and release the brakes in assemblies 95-98 so that the trailer can be moved. Such rotation of the valve handle 200 simultaneously closes the chamber 220 and thus prevents the flow of compressed air to the flag alert 262, allowing the spring-biased display to be withdrawn. See FIG. 4. Further, when valve handle 200 is rotated to a position 200b, the chamber 210 is "closed" such that air is diverted to the whistle 240 and the air horn 250, and the chamber 220 is "open" such that air flows from the reservoir 99a to the alert flag display 262. When the valve handle 200 is rotated to a position 200a, the chamber 210 is "open" such that compressed air is directed to the trailer brake system so that the parking brakes are released and the whistle 240 and horns 250 do not sound, and the chamber 220 is "closed" such that compressed air from the reservoir 99a is prevented from reaching the alert flag 262 display so that it is withdrawn.

Yet further, it is to be appreciated that various implementations of the present invention may include an electrical switch 300 that may be used to activate the safety valve 10 by causing manipulation of the stem 202. Further, various implementations may include an override release valve 310 at any suitable location, such as the bottom of the trailer 18, in fluid communication with the safety valve 10 by means of a line 320 that would allow one to release override the safety valve 10. The override release valve 310, if desired, comprises a valve placed within the emergency brake system 90 of the trailer, specifically placed within the line 93b. The override release valve 310 would operate such that when opened, the valve 310 would allow compressed air to by-pass the safety valve 10 and reach the brake assemblies 95-98 so as to release the emergency or parking brakes thereof "T" connectors may be used to effect connection of the air line 320 to air line 93b. See FIG. 3. The construction and operation of the override release valve 310, in view of the foregoing, is within the skill of one of ordinary skill in the art.

Figure 6A:
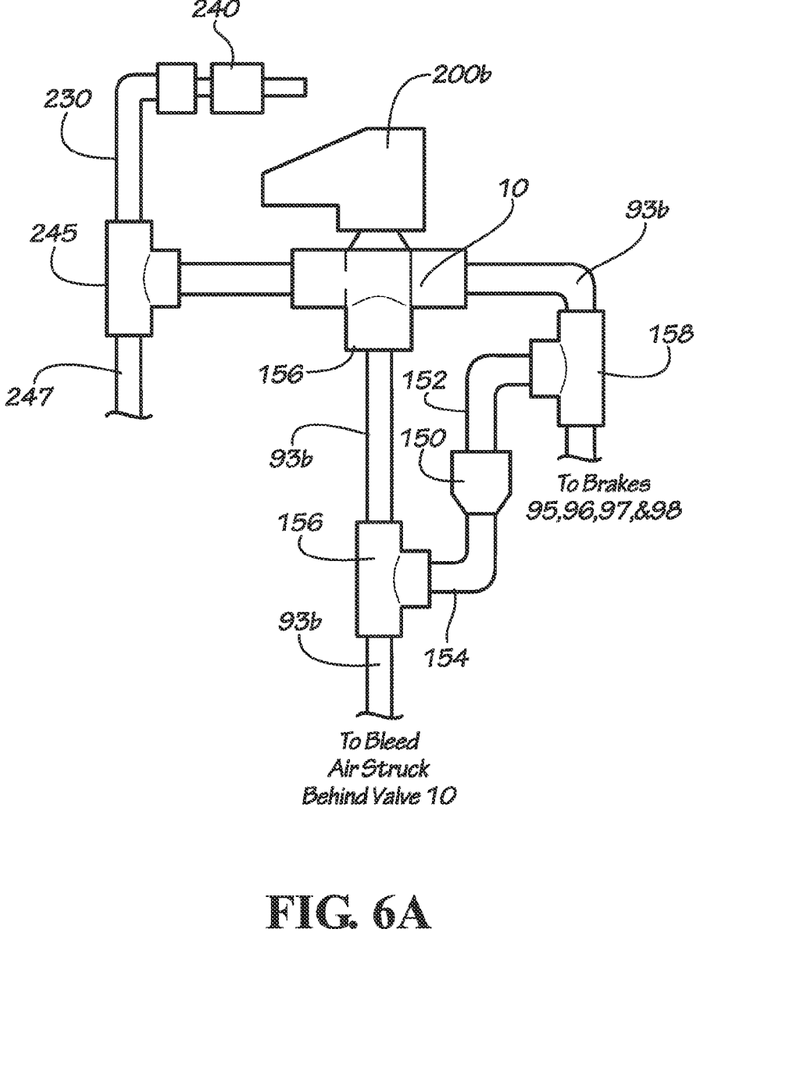
FIGS. 6A and 6B are a schematic representation of a safety valve system having a check valve according to one implementation.
Figure 6B:
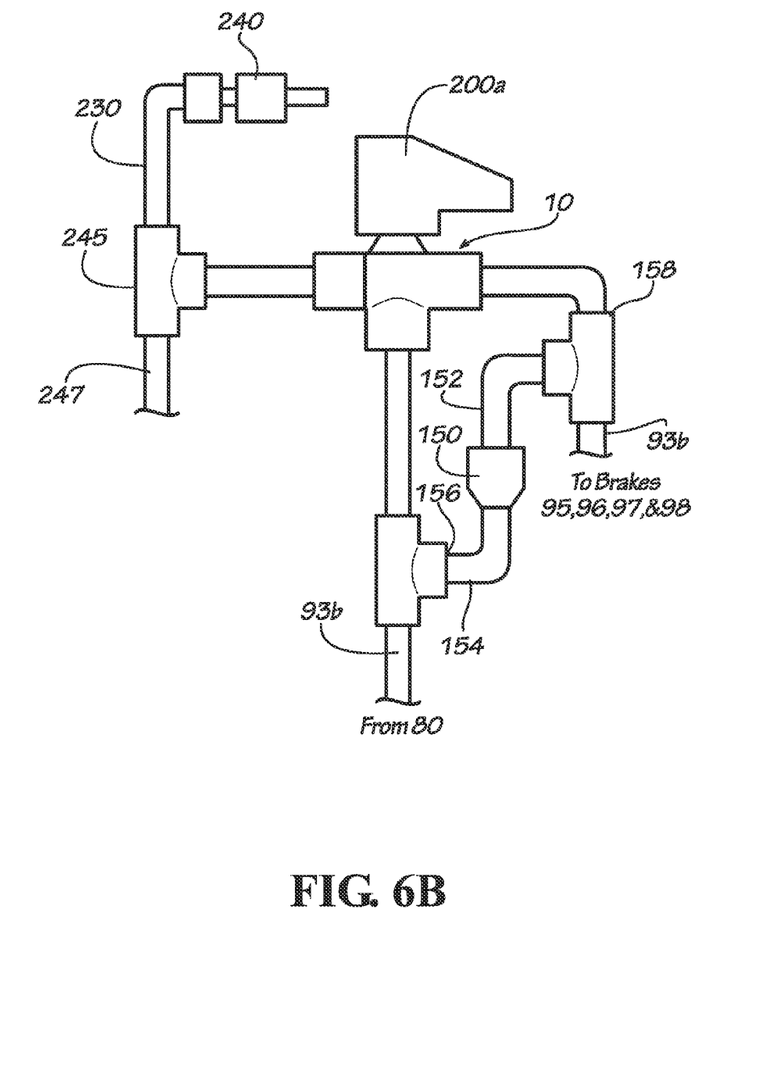

FIGS. 6A and 6B illustrate another implementation of the safety valve system shown in FIG. 3 that includes a one-way check valve 150. The check valve 150 is a one-direction flow check valve that allows fluid, such as air, hydraulic fluid, or other fluid, to flow from an inlet line 152 of the check valve 150 to an outlet line 154 of the check valve 150, but prevents flow in the opposite direction. The inlet line 152 is connected to a portion of the line 93b upstream of the safety valve 10 at connector 158, and the outlet line 154 is connected to a portion of the line 93b that is downstream of the safety valve 10 at connector 156. Without this check valve 150, if the safety valve 10 is moved to the on position, as shown by handle 200b in FIG. 6A, before the driver sets, or engages, the emergency brake for the trailer, compressed air is trapped in the trailer emergency brake line 93b upstream of the safety valve 10, which prevents the emergency brakes 95, 96, 97, and 98 from being set. Because the air pressure in connector 156 is less than the air pressure in connector 158 in this scenario, the check valve 150 allows that trapped compressed air in the upstream line 93b and connector 158 to flow through the check valve 150 and into line 93b that is downstream of the safety valve 10 so it can bleed out of the brake system as intended. The arrows shown in FIG. 6A generally show the flow of air through the system in such a scenario.

FIG. 6B illustrates the flow of air through the system described above in FIG. 6A when the handle 200 for the safety valve 10 is in the open position, as indicated by 200a. In this configuration, the air flows through line 93b, into the safety valve 10, and outwardly from the safety valve 10 toward the brakes 95, 96, 97, and 98. Because the pressure at the connector 156 of the safety valve 10 is slightly higher than the pressure at the connector 158, the air does not continuously flow through the check valve 150.

Figure 7:
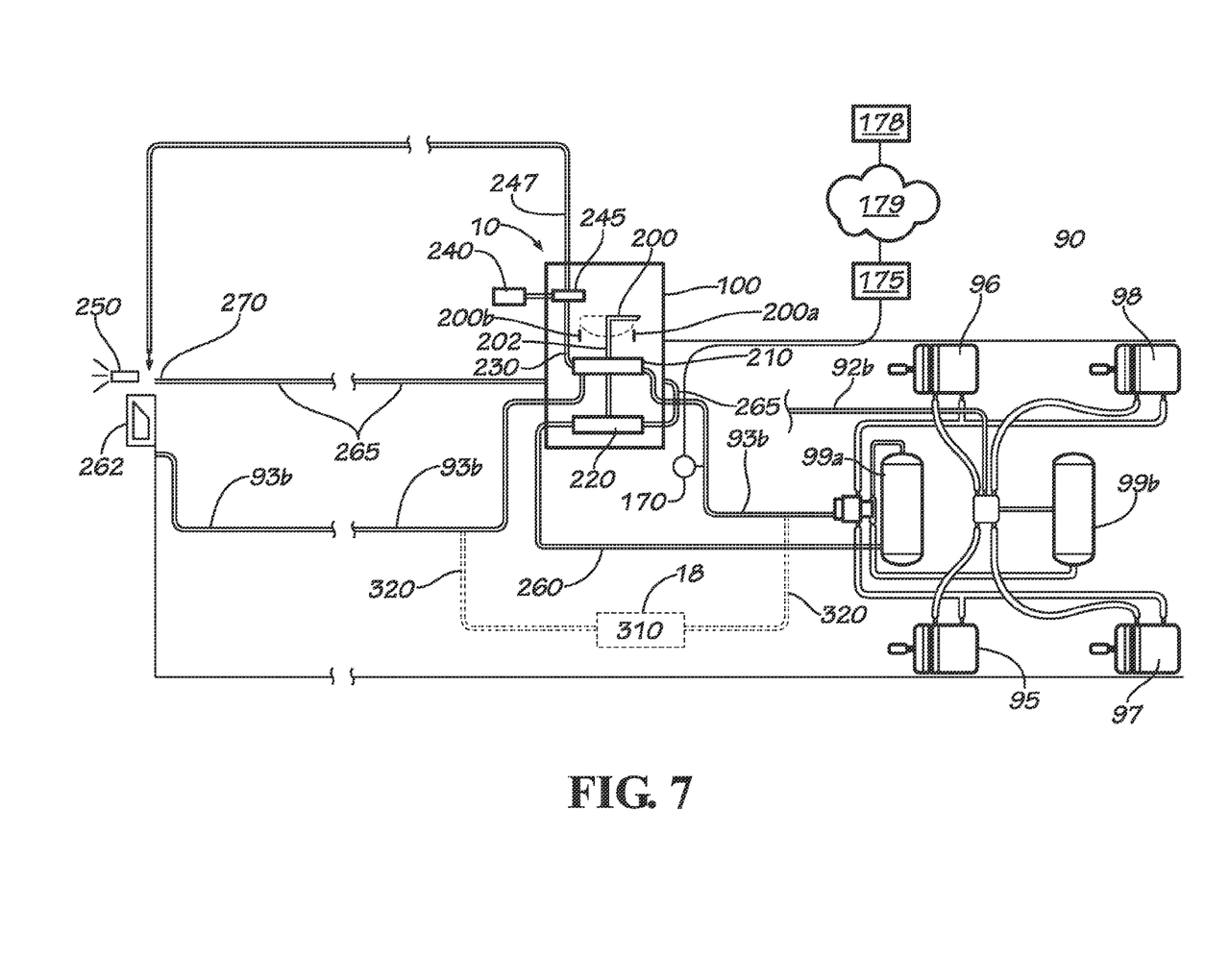
FIG. 7 is a schematic representation of the system shown in FIG. 3 further including a processor configured for wirelessly communicating with a remotely located computing device, according to one implementation.

According to other implementations, such as shown in FIG. 7, the tractor and/or trailer braking systems may be configured to communicate electronically over a wireless network with a computing device that is remotely located from the tractor and/or trailer. For example, in the implementation shown in FIG. 7, an electronic control unit (ECU) 180 is connected to a power source 182, which may include the tractor battery or a separate battery, a first air pressure sensor 170 in fluid communication with the line 83*b* upstream of the safety valve 10, and a second air pressure sensor 184 that is fluid communication with line 265 extending from the safety valve system 10. The first air pressure sensor 170 generates a signal corresponding to the air pressure in the trailer emergency brake line 93*b* upstream of the safety valve 10, and the second air pressure sensor 184 generates a signal corresponding to the air pressure in the line 265. The ECU 180 includes a processor 175 and is in communication with a remotely located computer via a wireless network 179. The processor 175 is configured for identifying an air pressure associated with the air pressure signal received from the first air pressure sensor 170 and the air pressure signal received from the second air pressure sensor 184. Positive pressure detected in line 265 may indicate that the safety valve 10 is closed, and no pressure in the line 265 may indicate that the safety valve 10 is open. If the processor 175 identifies the air pressure in lines 93*b* and 265 as being positive, this situation may indicate that the emergency brake for the trailer was not set before the safety valve 10 was closed. In response to identifying this condition, the processor 175 is configured for generating a message to the user of the remotely located computing device 178 indicating the condition and electronically communicating the message to the remotely located computing device 178.

According to one implementation (not shown), the remotely located computing device 178 may include a computer software program running thereon (e.g., an application) that displays or audibly plays the message for the user of the remotely located computing device 178. The program may also allow the user to selectively engage the trailer emergency braking system remotely through the program. For example, the program may provide a button or other user interface configured to receive instructions from the user to set the trailer emergency braking system. The instruction is communicated wirelessly to the processor 175, and the processor generates and sends instructions to the valve associated with the hand brake 80 for the trailer emergency system to set the trailer emergency brakes 95, 96, 97, and 98.

The messages generated by the processor 175 may include audible or visual alerts. For example, the audible alert may include an alarm sound or a prerecorded message indicating that the emergency brake should be engaged or that is it has been disengaged. The visual alert may include one or more lights, such as LED lights or a flashing alert on a mobile or remotely located computing device, or a written message indicating that the emergency brake should be engaged or has been disengaged, for example. The messages may be communicated wirelessly over the wireless network 179 using any standard wireless protocol, such as, for example, Bluetooth, 802.11, or cellular.

The implementations described above are directed to a safety valve system that may be installed on a tractor trailer truck that uses compressed air to release the parking brakes of the trailer, allowing for the trailer to move with the tractor. However, it should be understood that the safety valve system described above may be modified for use with trucks that use compressed air to apply the parking brakes of the trailer or with trucks that use compressed air or another hydraulic fluid to apply or release the parking brakes. Such implementations are within the scope of this invention.

Those of ordinary skill in the art will appreciate that the foregoing description of the embodiments are written to the person of ordinary skill in the art, who may make various modifications thereto that are within the scope of the invention as defined by the below and within claims.

The invention claimed is:

1. A safety valve system for a trailer having an emergency parking brake system, comprising:
    a safety valve interposed within an air line for selectively blocking or allowing the flow of air to at least one parking brake of a trailer; and
    a handle attached to the safety valve, the handle being movable between a first position and a second position, the handle being disposed adjacent the trailer,
    a one way check valve having an inlet line and an outlet line in communication with the one way check valve, the inlet line being connected to a portion of the air line upstream of the parking brake and the outlet line being connected to a portion of the air line between a compressed air source and the safety valve,
    wherein:
        the one way check valve and the safety valve are separate from and in parallel with each other,
        movement into the first position urges the safety valve into a closed position and movement into the second position moves the safety valve into an open position, and
        the closed position precludes air from continuously flowing from the compressed air source through the safety valve to the parking brake.

2. The safety valve system of claim 1, wherein the safety valve comprises a chamber, and the system further comprises an alarm device, the alarm device comprising a sound device in fluid communication with said chamber of said safety valve, whereby selective closing of said chamber diverts the flow of air to said sound device so as to alert persons of a changed condition represented by the flow of air to said chamber.

3. The safety valve system of claim 2, wherein the chamber is a first chamber, the safety valve further comprises a second chamber, and the alarm device further comprises an alert flag that is in fluid communication with the second chamber, whereby movement of the handle into the first position causes air to be delivered from the second chamber to said alert flag so as to deploy said alert flag and display a message.

4. The safety valve system of claim 3 wherein the message includes a statement that the trailer is in use.

5. The safety valve system of claim 2, wherein the chamber is a first chamber, the safety valve further comprises a second chamber, the sound device is a first sound device, and the system comprises a second sound device, wherein the first chamber is in fluid communication with the first sound device and the second chamber is in fluid communication with the second sound device, and whereby selectively closing said first and second chambers diverts the flow of air to the first and second sound devices, respectively, so as to alert persons in close proximity and remotely from the safety valve of the changed condition represented by the flow of air to the first and second chambers.

6. The safety valve system of claim 1 wherein said safety valve is located at least partially within a sidewall of a trailer.

7. The safety valve system of claim 6 wherein said safety valve is accessible only from the interior of said trailer.

8. The safety valve system of claim 1 wherein manipulation of said safety valve is accomplished by an electric switch such that manipulation of said switch causes said safety valve to be opened or closed so as to correspondingly apply or release said parking brake.

9. The safety valve system of claim 1 further comprising an override release valve that permits compressed air to bypass the safety valve so as to allow compressed air to release said parking brake.

* * * * *